(12) United States Patent
Mitchell et al.

(10) Patent No.: US 10,532,533 B2
(45) Date of Patent: Jan. 14, 2020

(54) ADHESIVE LABEL, FACESTOCK FOR AN ADHESIVE LABEL AND ADHESIVE LABEL LAMINATE

(71) Applicant: UPM RAFLATAC OY, Tampere (FI)

(72) Inventors: Noel Mitchell, Wuppertal (DE); Päivi Kangas, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 45 days.

(21) Appl. No.: 15/579,381

(22) PCT Filed: Jun. 5, 2015

(86) PCT No.: PCT/FI2015/050389
§ 371 (c)(1),
(2) Date: Dec. 4, 2017

(87) PCT Pub. No.: WO2016/193528
PCT Pub. Date: Dec. 8, 2016

(65) Prior Publication Data
US 2018/0147806 A1    May 31, 2018

(51) Int. Cl.
*B31D 1/02* (2006.01)
*B32B 27/32* (2006.01)
(Continued)

(52) U.S. Cl.
CPC ............... *B31D 1/021* (2013.01); *B32B 7/06* (2013.01); *B32B 7/12* (2013.01); *B32B 27/18* (2013.01);
(Continued)

(58) Field of Classification Search
CPC ......... B31D 1/021; B32B 27/18; B32B 27/08; B32B 27/32; B32B 27/327;
(Continued)

(56) References Cited

U.S. PATENT DOCUMENTS

2008/0199647 A1* 8/2008 Blackwell ............... B32B 27/32
428/41.8
2011/0311792 A1* 12/2011 Batra ...................... B32B 27/08
428/213
(Continued)

FOREIGN PATENT DOCUMENTS

WO    2008011402 A1    1/2008
WO    2010103191 A1    9/2010
(Continued)

OTHER PUBLICATIONS

International Search Report for International Application No. PCT/FI2015/050389; Date of Completion: Sep. 4, 2015; dated Sep. 8, 2015; 3 Pages.
(Continued)

*Primary Examiner* — Scott R. Walshon
(74) *Attorney, Agent, or Firm* — Cantor Colburn LLP (57) ABSTRACT

An adhesive label and an adhesive label laminate includes a uniaxially in machine direction oriented multilayer facestock comprising a printable skin layer comprising more than 50 wt. % of linear low density polyethylene(s) and less than 50 wt. % of propylene polymer(s), and an adhesive receiving skin layer comprising at least 50 wt. % of propylene homopolymer(s) and at least one of the following modifiers: hydrocarbon resin, styrene block copolymer, and olefin block copolymer. Further use of an adhesive label for labelling of an article and a labelled article are also disclosed.

13 Claims, 2 Drawing Sheets

(51) Int. Cl.
*B32B 7/06* (2019.01)
*B32B 7/12* (2006.01)
*G09F 3/02* (2006.01)
*B32B 27/18* (2006.01)
*B32B 37/12* (2006.01)

(52) U.S. Cl.
CPC .............. *B32B 27/32* (2013.01); *B32B 37/12* (2013.01); *G09F 3/02* (2013.01); *B32B 2250/242* (2013.01); *B32B 2270/00* (2013.01); *B32B 2274/00* (2013.01); *B32B 2307/516* (2013.01); *B32B 2323/10* (2013.01); *C09J 2203/334* (2013.01); *C09J 2423/006* (2013.01); *C09J 2423/046* (2013.01); *C09J 2423/106* (2013.01)

(58) Field of Classification Search
CPC ... B32B 2405/00; B32B 2519/00; B32B 7/12; G09F 3/02; G09F 3/10; G09F 2003/023; G09F 2003/0241; G09F 2003/0257; G09F 2003/0272; G09F 2003/0273; G09F 2003/0275; G09F 2003/0276; C09J 2203/334; C09J 2423/006; C09J 2423/106; C09J 2423/046
See application file for complete search history.

(56) References Cited

U.S. PATENT DOCUMENTS

| | | | |
|---|---|---|---|
| 2012/0060997 A1* | 3/2012 | Mitchell | B32B 27/08 156/60 |
| 2013/0177802 A1* | 7/2013 | Zaikov | B32B 27/32 429/176 |
| 2014/0134430 A1* | 5/2014 | Mitchell | G09F 3/10 428/354 |
| 2016/0318288 A1* | 11/2016 | Pham | B32B 27/08 |

FOREIGN PATENT DOCUMENTS

| | | |
|---|---|---|
| WO | 2014013131 A1 | 1/2014 |
| WO | 2015004314 | 1/2015 |

OTHER PUBLICATIONS

Written Opinion of the International Searhcing Authority for International Application No. PCT/FI2015/050389, Date of completion: Sep. 4, 2015, dated Sep. 8, 2015, 6 Pages.

International Preliminary Report on Patentability for International Application No. PCT/FI2015/050389, Date of Submission of the Demand: Apr. 4, 2017; Date of Completion: Sep. 14, 2017; 13 Pages.

* cited by examiner

ADHESIVE LABEL, FACESTOCK FOR AN ADHESIVE LABEL AND ADHESIVE LABEL LAMINATE

CROSS REFERENCE TO RELATED APPLICATIONS

This application is a 371 of International Application No. PCT/FI2015/050389, filed Jun. 5, 2015, which is incorporated herein in its entirety.

FIELD OF THE APPLICATION

The present invention relates to adhesive labels and adhesive label laminates. More particularly, the invention relates to a machine direction oriented facestock of the adhesive label.

BACKGROUND

It is general practice to apply a label to a surface of an article, such as bottle made of polymer or glass, to provide decoration, identification and/or information for example on the contents of the article, a trade name or logo.

SUMMARY

It is an aim of the embodiments to provide a facestock for adhesive label, an adhesive label and an adhesive label laminate comprising a facestock.

According to an embodiment an adhesive label is provided. The adhesive label comprises an uniaxially in machine direction oriented multilayer facestock comprising layers in the following order: a printable skin layer, a core layer, and an adhesive receiving skin layer. The printable skin layer comprises more than 50 wt. % of linear low density polyethylene(s) and less than 50 wt. % of propylene polymer(s). The adhesive receiving skin layer comprises at least 50 wt. % of propylene homopolymer(s) and at least one of the following modifiers: hydrocarbon resin, styrene block copolymer, and olefin block copolymer.

According to an embodiment a facestock for an adhesive label is provided. The facestock is uniaxially oriented in machine direction and comprises layers in the following order: a printable skin layer, a core layer, and an adhesive receiving skin layer. The printable skin layer comprises more than 50 wt. % of linear low density polyethylene(s) and less than 50 wt. % of propylene polymer(s). The adhesive receiving skin layer comprises at least 50 wt. % of propylene homopolymer(s) and at least one of the following modifiers: hydrocarbon resin, styrene block copolymer, and olefin block copolymer.

According to an embodiment a use of an adhesive label for labelling of an article is provided.

According to an embodiment a combination of an adhesive label and an article is provided.

According to an embodiment an adhesive label laminate is provided. The adhesive label laminate comprises a pressure sensitive adhesive layer at the adhesive receiving skin layer of the facestock and a release liner adjacent to the pressure sensitive adhesive layer.

Further embodiments are presented independent claims.

According to an example, the adhesive receiving skin layer further comprises less than 10 wt. % of low density polyethylene(s).

According to an example, the adhesive receiving skin layer comprises the following modifiers: between 5 and 20 wt. % of hydrocarbon resin compound and between 5 and 20 wt. % of styrene block copolymer(s).

According to an example, the styrene block copolymer is a styrene-ethylene-propylene-styrene.

According to an example, the core layer comprises at least 50 wt. % of polypropylene homopolymer(s), less than 10 wt. % of low density polyethylene, and following modifiers: between 5 and 20 wt. % of hydrocarbon resin compound and between 5 and 20 wt. % of styrene block copolymer(s).

According to an example, the adhesive receiving skin layer comprises the following modifier: between 5 and 20 wt. % of ethylene-octene block copolymer.

According to an example, the adhesive receiving skin layer further comprises the following modifier: between 1 and 10 wt. % of propylene-ethylene block copolymer.

According to an example, the core layer comprises at least 50 wt. % of polypropylene homopolymer(s), and the following modifier: between 5 and 20 wt. % of ethylene-octene block copolymer.

According to an example, the core layer further comprises the following modifier: between 1 and 10 wt. % of propylene-ethylene block copolymer.

According to an example, the adhesive skin layer and the core layer further comprise less than 10 wt. % of low density polyethylene(s).

According to an example, the printable skin layer further comprises between 0.5 and 15 wt. % of olefin block copolymer.

According to an example, the olefin block copolymer is an ethylene-octene block copolymer.

According to an example, the multilayer facestock is uniaxially oriented in machine direction having stretch ratio between 3 and 9.

According to an example, total thickness 100% of the facestock includes 5% of the printable skin layer, 85% of the core layer and 10% of the adhesive receiving skin layer.

According to an example, the adhesive receiving skin layer comprises a coating of a pressure sensitive adhesive layer for adhering the adhesive label to the surface of an item to be labelled.

DESCRIPTION OF THE DRAWINGS

In the following examples, the embodiments of the invention will be described in more detail with reference to appended drawings, in which.

DETAILED DESCRIPTION

In this description and claims, the percentage values relating to an amount of a material are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

Sx, Sy, Sz 3D coordinates,

TD transverse direction,
CD cross direction,
MD machine direction,
MRK1 graphics (printing),
DSC differential scanning calorimeter,
GPC gel permeation chromatography,
Mn number average molecular weight,
Mw weight average molecular weight,
1 a label laminate,
2 a release liner,
4 a facestock,
5 an adhesive layer,
7 an adhesive label,
8 a core layer,
9 a first skin layer,
10 a second skin layer,
100 an article
20 a labelled article.

A label is a piece of material carrying information and to be applied onto articles of different shapes and materials. An article may be a package, such as a bottle. A label comprises at least a face layer also referred to as a face stock layer. Usually the label comprises also an adhesive layer. A label comprising pressure sensitive adhesive may be referred to as a pressure sensitive adhesive (PSA) label. Pressure sensitive adhesive labels may also be referred to as self-adhesive labels.

Labels may be used in wide variety of labelling applications and end-use areas, such as labelling of food, home and personal care products, industrial products, pharmaceutical and health care products, beverage and wine bottles, tyres etc. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terphtalate (PET) bottles, and bottles made of polyolefin, such as high density polyethylene (HDPE) and polypropylene (PP). The label may surround the labelled article, such as a bottle, completely or partially.

Figure 1:
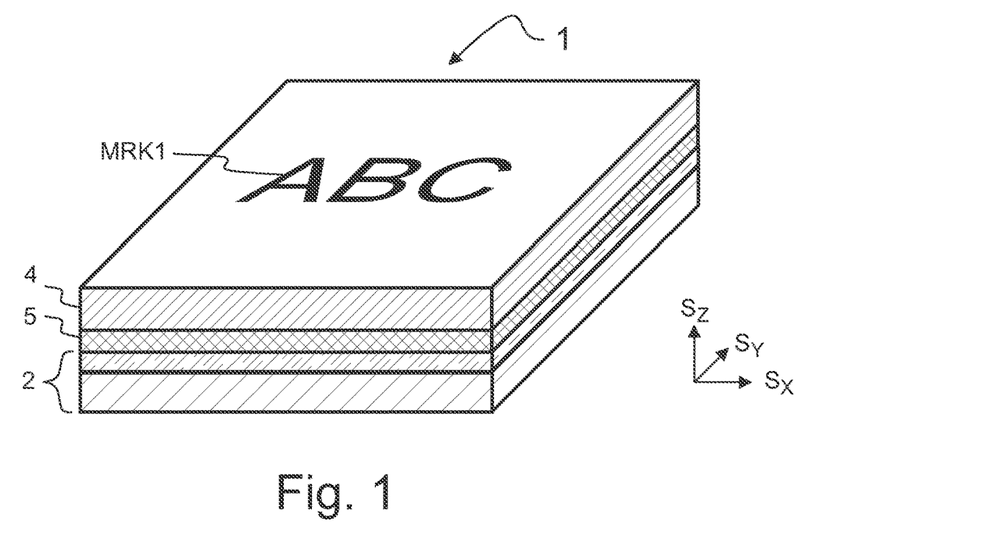
FIG. 1 shows, in a 3D view, an example embodiment of a label laminate comprising printing.

Term "face layer" 4 refers to a top layer of the label, also called as a facestock, a face material layer, or a face film. The face layer may have a monolayer or multilayer film structure comprising at least two layers. The multilayer structure may be co-extruded or it may comprise several layers laminated together. The face layer 4 is the layer that is adhered to the surface of an article during labelling through an adhesive layer 5. A combination comprising a face layer 4 and an adhesive layer 5 may be referred to as an adhesive label 7. The face layer may comprise e.g. printing in order to provide information and/or visual effect, such as information of the content of the item labelled. Graphical patterns may be performed by printing to the face stock prior to lamination of the label laminate structure 1. Alternatively, the face stock of a laminated structure 1 is printed. A label laminate structure or a label consisting of printed face stock layer may be referred to as a printed laminate or printed label. With reference to FIG. 1, the printing layer MRK1 may be on top of the face layer 4. A protective layer(s) (overlaminate layer(s)), such as lacquer, may be on top of the printing layer. Alternatively, the face stock may be reverse printed i.e. the surface of the face stock adjacent to the adhesive layer comprises printing.

Printable facelayer is suitable for printing by any of the known printing methods, such as with gravure, flexographic process, offset, screen or letterpress. Printable facelayer comprises a printable surface. The printing may exist on a top surface, reverse side or both top and reverse side of the face layer.

Term "printable surface" refers to a surface, such as a surface of a face layer, that is suitable for printing. Printable surface is also able to maintain the printing, such as printed text and/or graphics. Printable surface has sufficiently high surface energy. A low surface energy may lead to poor retaining capability of printing ink applied to the surface. According to an embodiment a printable label structure comprises at least one printable surface of a face stock.

Term "release liner" 2 refers to a structure comprising or consisting of a substrate and a release layer on the surface of the substrate contacting the adhesive layer 5 in a label laminate. A release layer may comprise or consist of a release agent. A release agent is a chemical having low surface tension and it is used to prevent other materials from bonding to it and to provide a release effect. Release liners of the label laminates serve one or more useful functions: they are used as a carrier sheet onto which the adhesive may be coated; they protect the adhesive layer during storage and transportation; they provide a support for labels during die-cutting and printing, and ultimately they release from the adhesive leaving it undamaged.

In this application term "label laminate", also referred to as "an adhesive label laminate" 1 refers to a product comprising a face stock 4, adhesive layer 5, and a release liner 2. In the label laminate the face stock 4 is laminated together with a release liner 2 having an adhesive layer 5 in between, as shown in FIG. 1. The label laminate may be a continuous structure from which the individual labels may be die-cut. In a FIG. 2, a label laminate comprising four cut labels 7 in a common release liner 2 is presented. The release liner of the label laminate is removed prior to labelling i.e. attaching the label onto the surface of an item to be labelled.

Figure 2:
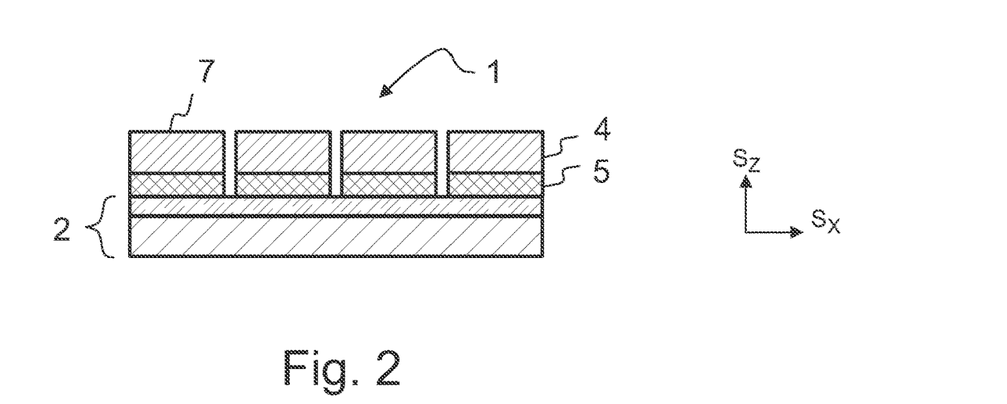
FIG. 2 shows, in a cross sectional view, a label laminate comprising cut labels attached to a common release liner.
Figure 3:
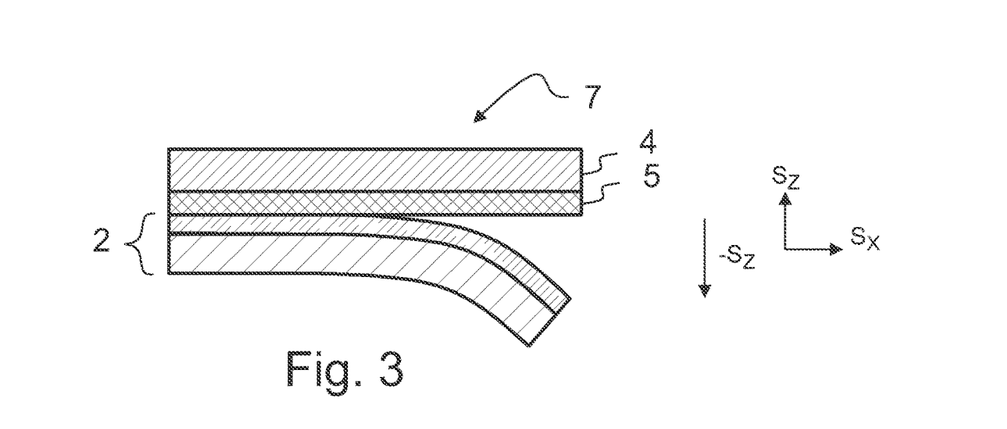
FIG. 3 shows, in a cross sectional view, separating label from release liner.

Referring to FIG. 2, individual labels 7, also referred to as adhesive labels, may be cut from the label laminate structure 1. In particular, the labels 7 may be die-cut from the label laminate structure 1. After the cutting, the labels may be attached to a common liner 2 (the liner remains uncut). Thus, a plurality of labels may remain attached to a common continuous liner 2. Alternatively, the labels 7 may be completely separate (i.e. also the liner 2 may be cut). Referring to FIG. 3, a label 7, including a face stock 4 and an adhesive layer 5, may be separated from the release liner 2 e.g. by pulling the liner 2 in the direction −Sz with respect to the label 7. Thus, a surface of the adhesive layer 5 is exposed so that said surface can be attached to an article to be labelled.

Figure 5:
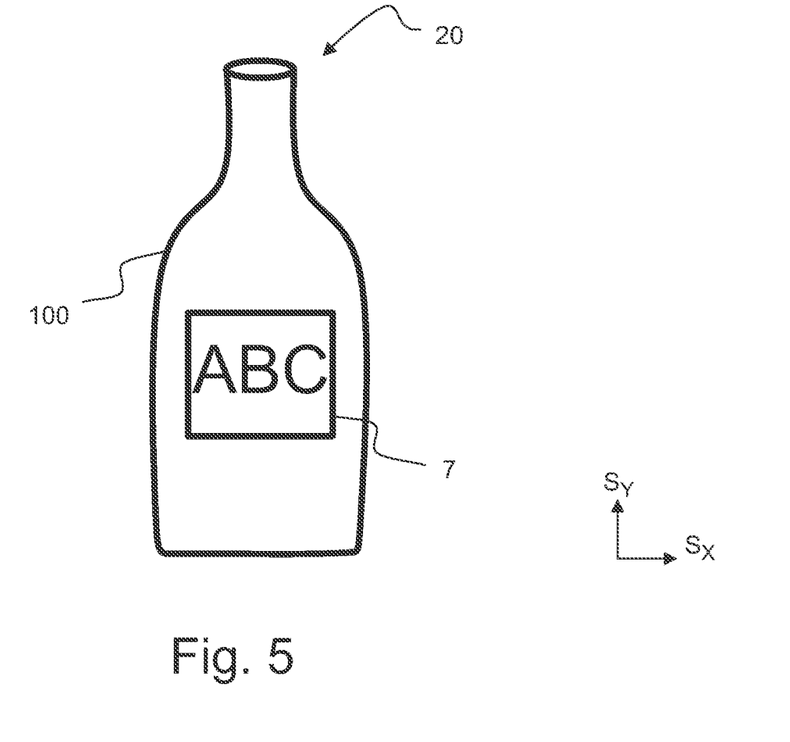
FIG. 5 shows a labelled article.

Referring to FIG. 5. the label 7 can be affixed to the substrate, i.e. to the surface of an article 100 through the adhesive layer 5 so as to form a labelled article 20. The adhesive layer may consist of a pressure sensitive adhesive (PSA). The labels consisting of PSA can be adhered to most surfaces through an adhesive layer without the use of a secondary agent, such as a solvent, or heat to strengthen the bond. The PSA forms a bond when pressure is applied onto the label at room temperature, adhering the label to the product to be labelled. Examples of pressure sensitive adhesives include emulsion and water based PSAs, solvent based PSAs and solid PSAs. Alternatively, a label may be a linerless label comprising a facestock and a layer of activatable adhesive.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. The PSA layer may have a thickness in the range of about 5-40 μm, for example in the range of about 8-20 μm. The amount of the adhesive layer may be 10-20 g/m², or preferably less than 15 g/m²; or more preferably less than 10 g/m².

Term "conformability" refers to the capability of the label 7 to conform smoothly to the contour of the article even when this is curved in two dimensions.

Term "dualistic asymmetric" or "double asymmetric" refers to a multilayer facestock having both different layer thickness and composition of separate layers.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer of a label refers to a configuration, where the topmost layer forms upper part of the label structure arranged opposite to an adhesive layer (undermost layer) attaching the label structure onto the surface of an item.

Molecular weight determination of the polymers, such as linear low density polyethylene, can be provided by using gel permeation chromatography (GPC) in order to provide $M_n$ and $M_w$ values referred to in the description. Narrow molecular weight polystyrene standards and appropriate Mark-Houwink coefficients are used for determination.

Term "machine direction" MD refers to the running direction $S_x$ of the face layer or continuous label laminate during label manufacturing. "Transverse direction" TD or "cross direction" CD refers to the direction $S_y$ perpendicular to the running direction $S_x$ of the face layer or label laminate.

Stretch ratio refers to the ratio of total film thickness before and after stretching. In other words, stretch ratio is the ratio of non-oriented (undrawn) film thickness to the oriented (stretched) film thickness. The non-oriented thickness is the thickness after extrusion and subsequent chilling of the film, such as a face stock. During stretching, the thickness diminishes in the same ratio as the film is stretched or elongated. For example, a face stock having thickness of 100 micrometres before machine direction orientation (MDO) is stretched by a stretch ratio of 5. After the machine direction orientation the face stock has a fivefold diminished thickness of 20 micrometres.

During stretching the randomly oriented polymer chains of the extruded plastic faces stock are oriented in the direction of stretching (drawing). Orientation under uniaxial stress provides orientation of polymer chains in the direction of stress provided. In other words, the polymer chains are oriented at least partially in the direction of stretching (drawing). Thus, the oriented face stock comprises or consists of polymer chains having specific orientation degree in the direction of stretching. The degree of orientation of the polymer chains depends on amount of stretching. Thus, the polymer chains in the faces stock having higher orientation degree are more oriented when compared to the faces stock having lower orientation degree.

Materials for Facestock

Below materials, also referred to as components, of the facestock layer(s) are provided.

In the present application term "modifier" refers to polymeric additives of polymeric facestock. The modifier includes, for example, hydrocarbon resin(s), styrene block copolymer(s), olefin block copolymer(s), or any mixture of these. Facestock layers may comprise one or more than one modifier. For example a mixture of modifiers comprising a first modifier and a second modifier. In an example, the face layer comprises a mixture of modifiers comprising hydrocarbon resin (a first modifier) and styrene block copolymer (a second modifier). Alternatively, the face layer comprises a mixture of modifiers comprising various olefin block copolymers, such as a first olefin block copolymer and a second olefin block copolymer. Alternatively, the face layer may comprise only one modifier, such as an olefin block copolymer.

Hydrocarbon resin (HC resin) refers to low molecular weight compounds (polymers/oligomers) consisting of only hydrogen and carbon. Hydrocarbon resins may have amorphous structure. They may be derived from synthetic monomers. Alternatively, they may be derived from natural monomers. For example, petroleum based hydrocarbon resins may be used. Hydrocarbon resins may be partially or fully hydrogenated. Saturated hydrocarbons are composed entirely of single bonds and are saturated with hydrogen (fully hydrogenated). The hydrocarbon resin may be aromatic, i.e. having at least one aromatic ring. Alternatively, it may be an acyclic or cyclic aliphatic resin. The hydrocarbon resin may be added during the manufacturing process of a film as a compound consisting of HC resin and a suitable carrier, such as thermoplastic olefin polymer. The carrier may be for example, propylene homopolymer.

The number average molecular weight ($M_n$) of the HC may be below 2000 g/mol. For example, the $M_n$ may be between 400 and 500 g/mol and the $M_w$ (weight average molecular weight) between 600 and 700 g/mol, when measured via gel permeation chromatography (GPC) using PS standards. The softening point according to ASTM E 28 may be below 140° C., preferably between 90 and 140° C.

Hydrocarbon resin may have effect on increasing the stiffness of the facestock. It may also have effect on improving the clarity of the facestock.

Styrene block copolymer (SBC) refers to styrene containing block copolymers including, for example, styrene-ethylene-propylene-styrene (SEPS), styrene-ethylene-butylene-styrene (SEBS), styrene-ethylene-propylene copolymer (SEP) and styrene-ethylene-ethylene-propylene-styrene copolymer (SEEPS).

Preferably styrene-ethylene-propylene-styrene (SEPS) is used for facestock. Optionally, styrene-ethylene-butylene-styrene (SEBS) may be used. It is also possible to use mixtures of styrene block copolymers, such as mixtures of SEBS and SEPS.

Styrene block copolymers, such as SEPS, may have effect on decreasing stiffness and increasing the flexibility of the film thus enhancing the conformability of the film. In other words, styrene block copolymers may have effect on providing facestock flexible enough to conform with the surface of the item labelled, i.e. the facestock is able to accommodate with the underlying contour without wrinkles. SEPS may also have effect on tear resistance of the film in machine direction.

In an example, styrene block copolymer based on styrene and ethylene/butene has polystyrene content of 30%. Specific gravity may be 0.91 gm/cc, when measured according to standard ASTM D4025. Melt flow may be from 15 to 23 g/10 min when measured at 190° C./2.16 kg according to standard ASTM D1238.

In an example, styrene block copolymer based on styrene and ethylene/propylene has polystyrene content of 21%.

Specific gravity may be 0.90 gm/cc, when measured according to standard ASTM D792. Melt index may be from 15 to 23 g/10 min, when measured at 230° C./5 kg according to standard ASTM D1238.

In an example, styrene block copolymer based on styrene and ethylene/propylene has polystyrene content of 6%.

Olefin Block Copolymers Refer to Polyolefin Modifiers, Such as Ethylene-Octene Block Copolymers.

Olefin block copolymers may be provided by chain-shuttling polymerization (dual catalyst system) resulting olefin block copolymers with alternating semicrystalline and amorphous segments. Semicrystalline segments consists of ethylene-octene blocks (hard segments) with very low co-monomer content and high melting temperature. Amorphous segments consists of ethylene-octene blocks (soft segments) with high co-monomer content and low glass transition temperature. Olefin block copolymers may be characterized by broader molecular weight distribution (MWD) compared to traditional anionic block copolymers made via living polymerization. Ethylene-octene block copolymer may have effect on die-cutting performance of the facestock. It may also have effect on conformability. Further it may have effect on anchorage of ink and/or adhesive. Density of the olefin block copolymer may be between 0.866 and 0.887 g/cm$^3$, when measured according to standard ASTM D729. Olefin block copolymers may have sharp melting peaks. Melting temperature may be between 118 and 122° C. Melt index may be between 0.5 and 15 g/10 min, when measured at 2.16 kg/190° C. according to standard ASTM D1238. Glass transition temperature may be between −65 and −54° C.

In an example, ethylene-octene block copolymer has density of 0.877 g/cm$^3$, when measured according to standard ASTM D792. Melt index may be 5.0 g/10 min when measured at 190° C./2.16 kg according to standard ASTM D1238. Melting temperature may be 122° C. based on DCS measurement (differential scanning calorimetry).

In an example, ethylene-octene block copolymer has density of 0.866 g/cm$^3$, when measured according to standard ASTM D792. Melt index may be 5.0 g/10 min when measured at 190° C./2.16 kg according to standard ASTM D1238. Melting temperature may be 119° C. based on DCS measurement.

In an example, ethylene-octene block copolymer may have density of 0.887 g/cm$^3$, when measured according to standard ASTM D792. Melt index may be 5.0 g/10 min when measured at 190° C./2.16 kg according to standard ASTM D1238. Melting temperature may be 119° C. based on DCS measurement.

In an example, ethylene octene-block copolymer may be at least one of the following having density 0.877 g/cm$^3$ and MFR 1.0 g/10 min; density 0.866 g/cm$^3$ and MFR 1.0 g/10 min; density 0.869 g/cm$^3$ and MFR 0.5 g/10 min.

Other Polyolefin Modifiers May be Propylene-Ethylene Block Copolymers.

Propylene-ethylene block copolymer may be made with chain-grafting catalyst technology. Propylene-ethylene block copolymers may comprise isotactic polypropylene segments and crystalline polyethylene segments. Propylene-ethylene block copolymer, may have effect on clarity of the facestock. In example, it reduces the haze and thus improves the clarity. Propylene-ethylene block copolymer may have melt flow rate at 230° C./2.16 kg of approximately 6.5 g/10 min (measured according to standard ASTM D1238). Density may be 0.863 g/cm$^3$ (measured according to standard ASTM D 792). DSC melting point may be 120° C. (measured according to ASTM D 3418).

Instead or in addition to modifier of propylene-ethylene block copolymer a nucleating agent, such as Bis(4-propylbenzylidene) propyl sorbitol may be used. In the polypropylene compound an amount of the nucleating agent may be 10%. Amount of polypropylene compound comprising nucleating agent may be between 2 and 10 wt. %, or between 2 and 5 wt. %.

Instead or in addition to modifier of propylene-ethylene block copolymer a polypropylene compound comprising phosphate type nucleating agent e.g. aluminium hydroxybis{2,2"-methylenebis[4,6-di(tert-butyl)phenyl]phosphate} may be used. Amount polypropylene compound comprising nucleating agent may be between 2 and 10 wt. %, or between 2 and 5 wt. %.

Alternatively or in addition to previous polyolefin modifiers a facestock layer(s), such as a core layer and/or the second skin layer, may comprise olefin elastomer(s) and/or olefin plastomer(s). In an example, they may be used in facestock layer compositions comprising propylene polymers having melt flow rate (MFR) below 8 g/10 min or below 5 g/10 min.

Olefin elastomer as a modifier may be at least one of the following random copolymer of ethylene-butene, also referred to as ethylene-butene elastomer, and random copolymer of ethylene-octene, also referred to as ethylene-octene elastomer. Random copolymer of ethylene-butene may comprise butene-1 with low, medium, or high ethylene content. Olefin elastomer may also comprise propylene based elastomers, such as propylene-ethylene copolymers, and/or butene-1 homopolymers. Butene-1 homopolymer may also be referred to as polybutene-1. Butene-1 is semi-crystalline homopolymer, which are compatible with polypropylene due its similar molecular structure. Ethylene elastomers may be provided by metallocene catalyst also referred to as single-site catalyst or by constrained geometry metallocene catalyst. The metallocene catalyst selectively polymerizing the ethylene and co-monomer sequences, such as butene or octene and increasing co-monomer content will produce polymers with higher elasticity, referred to olefin elastomers, as the co-monomer incorporation disrupts the polyethylene crystallinity. Olefin elastomers may have effect on flexibility of the polymer film. Olefin elastomers may also have effect on clarity of the polymer film.

Melt index of olefin elastomers, such as random copolymers comprising ethylene, at 190° C. may be between 0.5 and 30 g/10 min, preferably between 0.5 and 5, when measured according to standard ASTM D1238. Alternatively, melt flow rate at 190° C./2.16 kg may be between 2.5 and 4 g/10 min, when measured according to standard ISO 1133. Density may be between 0.857 and 0.915 g/cm$^3$, when measured according to standard ASTM D792. Alternatively, density may be between 0.897 and 0.911 g/cm$^3$, when measured according to standard ISO 1183. Glass transition temperature may be between −65 and −30° C. according to DSC measurements. Melting peak temperature may be between 34 and 120° C., according to DSC measurements using heating rate 10 degrees C./min. Total crystallinity may be between 10 and 15%.

In an example, the facestock layer(s) may comprise ethylene-octene elastomer(s), being a random copolymer of ethylene and octene co-monomers. Ethylene-octene copolymers may be provided by single-site metallocene catalyst or by constrained geometry metallocene catalyst. Melt index of ethylene-octene elastomers at 190° C. may be between 0.5 and 30 g/10 min, or between 1 and 10 g/10 min, preferably between 3 and 7 g/10 min, when measured according to standard ASTM D1238. Density may be between 0.855 and 0.910 g/cm³, or between 0.863 and 0.900 g/cm³, preferably between 0.865 and 0.0880 g/cm³, when measured according to standard ASTM D792. Glass transition temperature may be between −61 and −30° C., or between −58 and −33° C., preferably between −58 and −50° C., when measured using DSC. Melting peak temperature may be between 36 and 105° C., or between 47 and 77° C., preferably between 55 and 65° C., when measured using DSC with heating rate 10 degrees C./min. Total crystallinity may be between 13 and 35%, or between 16 and 25%, preferably between 18 and 21%.

For example, ethylene-octene elastomer has MFR 5 g/10 min when measured at 190° C./2.16 kg according to ASTM D1238. Density may be 0.870 g/cm3 according to ASTM D792. Glass transition temperature may be −53° C. Melting temperature may be 59° C. Peak crystallization temperature may be 44° C. Total crystallinity may be 19%. Vicat softening temperature may be 37.0° C. according to ASTM D1525.

For example, ethylene-octene elastomer has MFR 0.5 g/10 min when measured at 190° C./2.16 kg according to ASTM D1238. Density may be 0.863 g/cm³ according to ASTM D792. Glass transition temperature may be −55° C. Melting peak temperature may be 47° C. Total crystallinity may be 16%.

For example, ethylene-octene elastomer has MFR 1 g/10 min when measured at 190° C./2.16 kg according to ASTM D1238. Density may be 0.870 g/cm³ according to ASTM D792. Glass transition temperature may be −52° C. Melting peak temperature may be 60° C. Total crystallinity may be 18%.

For example, ethylene-octene elastomer has MFR 3 g/10 min when measured at 190° C./2.16 kg according to ASTM D1238. Density may be 0.875 g/cm³ according to ASTM D792. Glass transition temperature may be −54° C. Melting peak temperature may be 65° C. Total crystallinity may be 20%.

For example, ethylene-octene elastomer has MFR 13 g/10 min when measured at 190° C./2.16 kg according to ASTM D1238. Density may be 0.864 g/cm³ according to ASTM D792. Glass transition temperature may be −55° C. Melting peak temperature may be 56° C. Total crystallinity may be 13%.

For example, ethylene-octene elastomer has MFR 3 g/10 min when measured at 190° C./2.16 kg according to ASTM D1238. Density may be 0.902 g/cm³ according to ASTM D792. Glass transition temperature may be −32° C. Melting peak temperature may be 97° C. Total crystallinity may be 29%.

In an example, the facestock layer(s) may include ethylene-butene elastomer(s). Ethylene-butene elastomers are random copolymers of ethylene and butene. Ethylene-butene elastomers may have density in range of 0.897-0.911 g/cm³ (ISO 1183). Alternatively, density may be between 0.862 and 0.891 g/cm³, when measured according to standard ASTM D 729.

Melt index may be between 0.5 and 5 g/10 min, when measured according to standard ASTM D1238 at 190° C./2.16 kg. Alternatively, melt flow rate (MFR) may be between 0.5 and 40 g/10 min, preferably between 0.5 and 4 g/10 min, or between 2.5 and 4 g/10 min (190° C./2.16 kg, ISO 1133). Melting peak temperature may be between 34 and 120° C., when measured using DSC with heating rate 10 degrees C./min. Alternatively melting temperature may be in range of 81-97° C., corresponding to melting point of crystalline form 2 measured after solidification. Glass transition temperature may be between −65 and −40° C., when measured using DSC. Total crystallinity may be between 12 and 28%.

In an example, ethylene-butene elastomer is random copolymer of butene-1 with medium ethylene content comprising density of 0.901 g/cm³, when measured according to standard ISO 1183. Melt flow rate may be 2.5 g/10 min, when measured at 190° C./2.16 kg according to standard ISO 1133. Melting temperature may be 85° C., corresponding with melting point of crystalline form 2 measured after solidification.

In an example, ethylene-butene elastomer is a random copolymer of butene-1 with high ethylene content having density of 0.897 g/cm³ according to ISO 1183 standard. Melt flow rate may be 3.5 g/10 min, when measured at 190° C./2.16 kg according to ISO 1133. Melting temperature may be 81° C.

In an example, ethylene-butene elastomer is a random copolymer of butene-1 with low ethylene content. It may have density of 0.911 g/cm³ according to ISO 1183 standard. Melt flow rate may be 4 g/10 min, when measured at 190° C./2.16 kg according to ISO 1133. Melting temperature may be 97° C.

In an example, ethylene-butene elastomer is a random copolymer of butene-1 with low ethylene content. It may have density of 0.913 g/cm³ according to ISO 1183 standard. Melt flow rate may be 1 g/10 min, when measured at 190° C./2.16 kg according to ISO 1133. Melting temperature may be 97° C.

In an example, ethylene-butene has density of 0.880 g/cm³ according to ASTM D792 standard. Melt index may be 0.8 g/10 min, when measured at 190° C./2.16 kg according to ASTM D1238. Melting peak may be 64° C., when measured using DSC with heating rate 10 degrees C./min.

In an example, ethylene-butene has density of 0.862 g/cm³ according to ASTM D792 standard. Melt index may be 1.2 g/10 min, when measured at 190° C./2.16 kg according to ASTM D1238. Melting peak may be 34° C., when measured using DSC with heating rate 10 degrees C./min.

In an example, ethylene-butene has density of 0.865 g/cm³ according to ASTM D792 standard. Melt index may be 5 g/10 min, when measured at 190° C./2.16 kg according to ASTM D1238. Melting peak may be 35° C., when measured using DSC with heating rate 10 degrees C./min.

In an example, ethylene-butene has density of 0.885 g/cm³ according to ASTM D792 standard. Melt index may be 2 g/10 min, when measured at 190° C./2.16 kg according to ASTM D1238. Melting peak may be 75° C., when measured using DSC with heating rate 10 degrees C./min.

In an example, ethylene-butene elastomer may be at least one of the following having density 0.855 g/cm³ and MFR 2.0 g/10 min; density 0.885 g/cm³ and MFR 2.5 g/10 min; density 0.874 g/cm³ and MFR 0.8 g/10 min; density 0.865 g/cm³ and MFR 5.0 g/10 min; and density 0.862 g/cm³ and MFR 3.6 g/10 min.

In an example, the facestock layer(s) includes butene-1 homopolymer(s).

Density of butene-1 homopolymer as an elastomer may be between 0.914 and 0.915 g/cm³ according to ISO 1183 standard. Melt flow rate may be between 0.4 and 200 g/10 min, preferably between 0.4 and 15, or between 0.4 and 4 g/10 min, when measured at 190° C./2.16 kg according to ISO 1133. Melting temperature may be between 114 and 124° C.

For example, butene-1 homopolymer has density of 0.915 g/cm³ according to ISO 1183 standard. Melt flow rate may be 15 g/10 min, when measured at 190° C./2.16 kg according to ISO 1133. Melting temperature may be 114° C.

For example, butene-1 hompolymer has density of 0.914 g/cm³ according to ISO 1183 standard. Melt flow rate may be 0.4 g/10 min, when measured at 190° C./2.16 kg according to ISO 1133. Melting temperature may be 117° C.

For example, butene-1 homopolymer has density of 0.915 g/cm³ according to ISO 1183 standard. Melt flow rate may be 4 g/10 min, when measured at 190° C./2.16 kg according to ISO 1133. Melting temperature may be 116° C.

In an example, the face stock layer(s) includes propylene based elastomer.

Density of propylene based elastomer may be between 0.863 and 0.868 g/cm³, when measured according to standard ASTM D792. Melt flow rate at 230° C./2.16 k g may be between 2 and 25 g/10 min, preferably between 2 and 8 g/10 min, when measured according to standard ASTM D1238. Glass transition temperature may be between −27 and −21° C. Melting peak temperature may be between 66 and 131° C. Total crystallinity may be between 11 and 14%.

For example, density of propylene based elastomer is 0.868 g/cm³, when measured according to standard ASTM D792. Melt flow rate at 230° C./2.16 kg may be 25 g/10 min, when measured according to standard ASTM D1238. Vicat softening temperature may be 51° C., when measured according to standard ASTM D1525.

For example, density of propylene based elastomer is 0.867 g/cm³, when measured according to standard ASTM D792. Melt flow rate at 230° C./2.16 kg may be 8 g/10 min, when measured according to standard ASTM D1238. Vicat softening temperature may be 42° C., when measured according to standard ASTM D1525. Glass transition temperature may be −27° C. Total crystallinity may be 11%.

For example, density of propylene based elastomer is 0.863 g/cm³, when measured according to standard ASTM D792. Melt flow rate at 230° C./2.16 kg may be 8 g/10 min, when measured according to standard ASTM D1238. Vicat softening temperature may be <20° C., when measured according to standard ASTM D1525. Glass transition temperature may be −29.8° C. Total crystallinity may be 14%.

For example, density of propylene based elastomer is 0.867 g/cm³, when measured according to standard ASTM D792. Melt flow rate at 230° C./2.16 kg may be 2 g/10 min, when measured according to standard ASTM D1238. Vicat softening temperature may be 43° C., when measured according to standard ASTM D1525. Glass transition temperature may be −27° C. Total crystallinity may be 13%.

Olefin plastomer as a modifier may be at least one of the following: propylene-ethylene plastomer and propylene-butene plastomer. Preferably, the olefin plastomer is propylene-butene plastomer. Propylene-ethylene plastomers may be provided by single-site metallocene catalyst and thus have molecular structure different from the typical Ziegler-Natta and metallocene catalyst based copolymers of propylene. According to an example, low-percentage of crystalline phase may be homogeneously dispersed in the butene-1 polymer. Olefin plastomers may have effect on elasticity of the polymer film. Olefin plastomers may also have effect on clarity. They may further have effect on providing good adhesion to other polyolefins.

Olefin plastomers may have narrow molecular weight distribution and broad crystallinity distribution. Molecular weight distribution ($M_w/M_n$) may be between 2 and 3. Melt flow rate (MFR) may be between 0.5 and 25 g/10 min (190° 012.16 kg), when measured according to standard ISO 1133. Alternatively, melt flow rate may be between 2 and 25 g/10 min, when measured according to standard ASTM D 1238 at 230° C./2.16 kg. Density may be between 0.859 and 0.890 g/cm³, when measured according to standard ASTM D 792. Co-monomer content may be between 5 and 15 wt. %. Glass transition temperature may be between −15 and −35 degrees C. Board crystallinity distribution resulting in broad melting behaviour and melting range being between 50 and 135 degrees C. Total crystallinity may be between 5 and 45%.

Linear low density polyethylene (LLDPE) refers to random copolymer of ethylene and longer chain alpha-olefins, such as butene, hexene or octene, provided by using either Ziegler-Natta catalyst. Density of LLDPE(s) may be at least 0.92 g/cm³, for example, between 0.930 and 0.950 g/cm³. Ziegler-Natta catalyst results a semicrystalline linear polymer with a plurality of molecular weights and copolymer molecules with variety of compositions. Ziegler-Natta catalysed LLDPE may have effect on providing at least some of the following effects: better heat-stability, higher density and stiffness.

In an example, LLDPE is Ziegler-Natta (Z-N) catalysed. Z-N catalysed LLDPE may comprise molecular weight distribution Mw/Mn between 3 and 4, between 3.5 and 4 or between 3.5 and 3.8. Mw refers to weight average molecular weight and Mn to number average molecular weight. Z-N catalysed LLDPE may comprise melt index between 0.5 and 25 g/10 min, or between 1 and 6 g/10 min, preferably between 0.5 and 5 or between 2 and 5 g/10 min, when measured at 190° C./2.16 kg according to standard ASTM D 1238. Density may be between 0.917 and 0.941 g/cm³, or between 0.925 and 0.940 g/cm³, preferably between 0.930 and 0.940 g/cm³, when measured according to standard ASTM D 792. Vicat softening point may be between 92 and 125° C., or between 110 and 120° C., when measured according to standard ASTM D1525. Melting temperature may be between 119 and 128° C. Z-N catalysed LLDPE may have effect on heat stability of the facestock.

For example, Z-N catalysed LLDPE may have MFR 2.5 g/10 min when measured at 190° C./2.16 kg according to standard ASTM D 1238. Density may be between 0.930 and 0.940 g/cm³, when measured according to standard ASTM D 792. Vicat softening point may be 118° C., when measured according to standard ASTM D1525.

For example, Z-N catalysed LLDPE may have melt index 1 g/10 min when measured at 190° C./2.16 kg according to standard ASTM D 1238. Density may be 0.922 g/cm³, when measured according to standard ASTM D 792. Vicat softening point may be 109° C., when measured according to standard ASTM D1525.

For example, Z-N catalysed LLDPE may have melt index 2 g/10 min when measured at 190° C./2.16 kg according to standard ASTM D 1238. Density may be 0.926 g/cm³, when measured according to standard ASTM D 792. Vicat softening point may be 109° C., when measured according to standard ASTM D1525.

For example, Z-N catalysed LLDPE may have melt index 6 g/10 min when measured at 190° C./2.16 kg according to standard ASTM D 1238. Density may be 0.919 g/cm³, when measured according to standard ASTM D 792. Vicat softening point may be 97.8° C., when measured according to standard ASTM D1525.

For example, Z-N catalysed LLDPE may have melt index 25 g/10 min when measured at 190° C./2.16 kg according to standard ASTM D 1238. Density may be 0.920 g/cm³, when measured according to standard ASTM D 792. Vicat softening point may be 92° C., when measured according to standard ASTM D1525.

Low density polyethylene (LDPE) refers to a branched ethylene homopolymer. It may comprise a density range 0.91-0.94 g/cm$^3$, when measured according to standard ISO 1183.

LDPE may have melt flow rate (MFR) between 0.2 and 10, between 0.5 and 8, or preferably between 0.7 and 4 g/10 min, when measured at 190° C./2.16 kg using method according to standard ISO 1133. Density may be between 0.919 and 0.934, or between 0.920 and 0.928 g/cm$^3$, when measured using test method according to standard ISO 1183. Vicat softening temperature may be between 88 and 111, or between 95 and 105° C. A50 (50° C./h 10N), when measured using test method according to standard ISO 306.

Low density polyethylene having melt flow rate between 0.7 and 4 g/10 min, density between 0.920 and 0.928 g/cm$^3$, and Vicat softening point between 95 and 105° C. may have effect on providing enhanced converting properties for labels.

In an example, the LDPE has melt flow rate (MFR) 0.25 g/10 min when measured at 190° C./2.16 kg according to ISO 1133 standard. Vicat softening temperature (A50) may be 96° C. according to standard ISO 306. Density may be 0.923 g/cm$^3$, when measured using test method ISO 1183.

In an example, the LDPE has melt flow rate (MFR) 0.75 g/10 min when measured at 190° C./2.16 kg according to ISO 1133 standard. Vicat softening temperature (A50) may be 96° C. according to standard ISO 306. Density may be 0.923 g/cm$^3$, when measured using test method ISO 1183.

In an example, the LDPE has melt flow rate (MFR) 0.95 g/10 min when measured at 190° C./2.16 kg according to ISO 1133 standard. Vicat softening temperature (A50) may be 100° C. according to standard ISO 306. Density may be 0.927 g/cm$^3$, when measured using test method ISO 1183.

In an example, the LDPE has melt flow rate (MFR) 1.9 g/10 min when measured at 190° C./2.16 kg according to ISO 1133 standard. Vicat softening temperature (A50) may be 90° C. according to standard ISO 306. Density may be 0.924 g/cm$^3$, when measured using test method ISO 1183.

In an example, LDPE has melt flow rate (MFR) 1.9 g/10 min when measured at 190° C./2.16 kg using method ISO 1133. Density may be 0.926 g/cm$^3$ using test method ISO 1183(A). Vicat softening temperature may be 99° C. at 10 N (VST/A) using test method ISO 306.

In an example, the LDPE has melt flow rate (MFR) 3 g/10 min when measured at 190° C./2.16 kg according to ISO 1133 standard. Vicat softening temperature (A50) may be 109° C. according to standard ISO 306. Density may be 0.934 g/cm$^3$, when measured using test method ISO 1183.

In an example, the LDPE has melt flow rate (MFR) 4 g/10 min when measured at 190° C./2.16 kg according to ISO 1133 standard. Vicat softening temperature (A50) may be 92° C. according to standard ISO 306. Density may be 0.924 g/cm$^3$, when measured using test method ISO 1183.

Propylene polymers (PP) refer to propylene homopolymer(s), propylene copolymer(s) and blends thereof. Propylene polymer(s) of the facestock layer(s) may have melt flow rate between 1.5 and 40 g/10 min, or between 1.5 and 25 g/10 min, when measured according to standard ISO 1133. The melt flow rate may also be measured according to standard ASTM D1238. Preferably the melt flow rate of propylene polymer(s) of the facestock layer(s) is between 1.5 and 10 g/10 min, or between 1.5 and 7.5 g/10 min, or between 1.5 and 4 g/10 min, when measured at 230° C./2.16 kg according to standard ISO 1133.

Propylene homopolymer refers to polymers consisting of repeating units of propylene only. The propylene homopolymer may have effect on providing required stiffness needed for the facestock.

According to an embodiment, propylene homopolymer(s) of the facestock layer(s) may have melt flow rate (MFR) between 1.5 and 40 g/10 min, or between 1.5 and 25 g/10 min, when measured at 230° C./2.16 kg according to standard ISO 1133. Density may be 0.900 g/cm$^3$, when measured according to standard ISO 1183. Vicat softening temperature may be between 152 and 155 degrees C. (A50 (50° C./h 10N)), when measured according to standard ISO 306 standard.

In an example, the propylene homopolymer has melt flow rate (MFR) 25 g/10 min, when measured at 230° C./2.16 kg according to standard ISO 1133. Vicat softening temperature may be 153 degrees C. (A50 (50° C./h 10N)), when measured according to ISO 306 standard. Vicat softening temperature may be 93 degrees C. (B50 (50° C./h 50N)), when measured according to ISO 306 standard.

According to an embodiment, in the core layer propylene homopolymer(s) may have melt flow rate (MFR) between 2 and 9.5, between 2 and 7.5, or preferably between 2 and 4 g/10 min, when measured at 230° C./2.16 kg according to standard ISO 1133. Density may be 0.900 g/cm$^3$, when measured according to standard ISO 1183. Vicat softening temperature may be between 152 and 155 degrees C. (A50 (50° C./h 10N)), when measured according to standard ISO 306 standard.

According to an embodiment, in the skin layers the propylene homopolymer(s) may have melt flow rate (MFR) between 2 and 7 g/10 min, or between 4 and 6 g/10 min, when measured at 230° C./2.16 kg according to standard ISO 1133. Density may be 0.900 g/cm$^3$, when measured according to standard ISO 1183. Vicat softening temperature may be between 151 and 155 degrees C. (A50 (50° C./h 10N)), when measured according to standard ISO 306 standard.

In an example, the propylene homopolymer has melt flow rate (MFR) 2 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer has melt flow rate (MFR) 2 g/10 min, when measured at 230° C./2.16 kg according to standard ISO 1133. Density may be 0.900 g/cm$^3$, when measured according to standard ISO 1183. Vicat softening temperature may be 155 degrees C. (A50 (50° C./h 10N)), when measured according to ISO 306 standard.

In an example, the propylene homopolymer has melt flow rate (MFR) 3 g/10 min, when measured at 230° C./2.16 kg according to standard ISO 1133. Density may be 0.900 g/cm$^3$, when measured according to standard ISO 1183. Vicat softening temperature may be 154 degrees C. (A50 (50° C./h 10N)), when measured according to ISO 306 standard.

In an example, the propylene homopolymer has melt flow rate (MFR) 7.5 g/10 min, when measured at 230° C./2.16 kg according to standard ISO 1133. Density may be 0.900 g/cm$^3$, when measured according to standard ISO 1183. Vicat softening temperature may be 152 degrees C. (A50 (50° C./h 10N)), when measured according to ISO 306 standard.

In an example, the propylene homopolymer has melt flow rate (MFR) 9.5 g/10 min, when measured at 230° C./2.16 kg according to standard ISO 1133. Density may be 0.900 g/cm$^3$, when measured according to standard ISO 1183. Vicat softening temperature may be 153 degrees C. (A50 (50° C./h 10N)), when measured according to ISO 306 standard.

Propylene copolymer refers to polymers random copolymers consisting of repeating units of propylene together with ethene or butene. Propylene copolymer may have melt flow rate (MFR) between 1.5 and 8 g/10 min, when measured at 230° C./2.16 kg according to standard ISO 1133. Density may be 0.900 g/cm$^3$, when measured according to standard ISO 1183.

In an example, the propylene random copolymer has melt flow rate (MFR) 7 g/10 min, when measured at 230° C./2.16 kg according to standard ISO 1133. Density may be 0.900 g/cm$^3$, when measured according to standard ISO 1183.

In an example, the propylene random copolymer has melt flow rate (MFR) 10 g/10 min, when measured at 230° C./2.16 kg according to standard ISO 1133. Density may be 0.900 g/cm$^3$, when measured according to standard ISO 1183. Vicat softening temperature may be 130 degrees C. (A50 (50° C./h 10N)), when measured according to ISO 306 standard.

In an example, the propylene random copolymer has melt flow rate (MFR) 8 g/10 min, when measured at 230° C./2.16 kg according to standard ISO 1133. Density may be 0.900 g/cm$^3$, when measured according to standard ISO 1183. Vicat softening temperature may be 125 degrees C. (A50 (50° C./h 10N)), when measured according to ISO 306 standard. Alternatively, Vicat softening temperature may be 120 degrees C. (A50 (50° C./h 10N)), when measured according to ISO 306 standard. Alternatively, Vicat softening temperature may be 139 degrees C. (A50 (50° C./h 10N)), when measured according to ISO 306 standard. Alternatively, Vicat softening temperature may be 130 degrees C. (A50 (50° C./h 10N)), when measured according to ISO 306 standard.

In an example, the propylene random copolymer has melt flow rate (MFR) 1.7 g/10 min, when measured at 230° C./2.16 kg according to standard ISO 1133. Density may be 0.900 g/cm$^3$, when measured according to standard ISO 1183.

In an example, the propylene random copolymer has high ethylene content and melt flow rate (MFR) 5 g/10 min, when measured at 230° C./2.16 kg according to standard ISO 1133-1. Density may be 0.895 g/cm$^3$, when measured according to standard ISO 1183-1. Melting point may be 134° C., when measured according to ASTM D 3417. Vicat softening temperature may be 120 degrees C. (10N), when measured according to ISO 306 standard/A50.

An antioxidant compound may be a blend of phenolic and phosphite antioxidants in LDPE carrier. Total amount of antioxidant in the compound is 20%.

An antiblocking agent compound may comprise 10% silica in propylene homopolymer carrier. Alternatively, the compound of antiblocking agent may comprise synthetic silica in polyethylene carrier.

Structure of a Facestock

A face stock layer 4 may have a multilayer plastic film structure including two or more plastic film layers. Multilayer structure has effect on providing more optimized face stock properties. The multilayer face stock, also referred to a multilayer film, may comprise a core layer and at least one skin layer. In a two layer structure comprising a core layer and a first skin layer an adhesive layer may be applied directly onto the second surface of the core layer opposite to first skin layer. Preferably, the face stock has a skin layer on both surfaces of the core layer, i.e. the face stock has a three layer structure.

Figure 4:
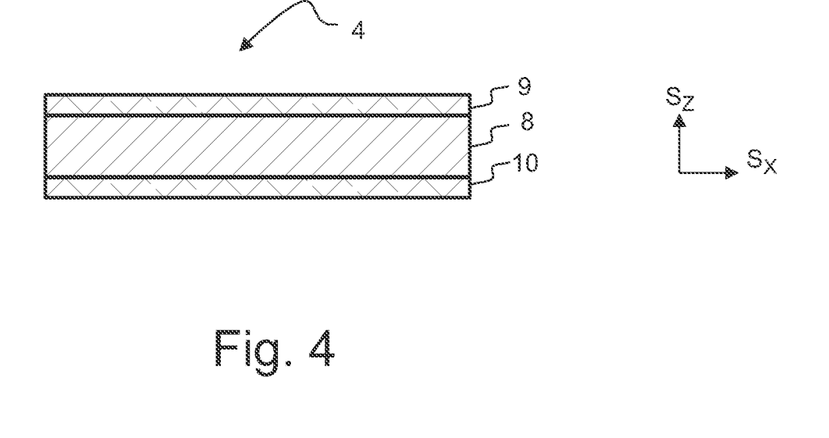
FIG. 4 shows, in a cross sectional view, a multilayer facestock.

According to an embodiment, a multilayer face stock has a three layer structure. With reference to FIG. 4, a three layer structure includes a core layer 8 having a first surface and a second surface. A first skin layer 9 is adjacent to the first surface of the core layer 8. A second skin layer 10 is adjacent to the second surface of the core layer 8.

At least one layer of the multilayer structure is suitable for printing. For example, the print receiving skin layer may have a surface energy at least 36 dynes/cm, preferably at least 38 dynes/cm or at least 44 dynes/cm measured according to the standard ASTM D-2578. The surface energy may be between 36 and 60 dynes/cm, preferably between 38 and 56 dynes/cm or between 44 and 50 dynes/cm. The surface energy level may also be maintained higher than or equal to 38 dynes/cm after 50 or 120 days. Surface energy expressed in units of dynes/cm meaning force/unit length may also be expressed in units of mN/m.

There may also be additional skin layers or other layers, such as barrier, tie and/or protective layers, in order to further improve the label features, such as label functionality, mechanical properties, or the visual appearance. Barrier layer(s) may be used in order to prevent, for example, migration of unwanted ingredients. An over-vanish or lacquer layer may be used e.g. on top of the print layer as a protective layer to protect the printing layer. Film surfaces may also be treated prior to printing, for example by flame treatment, corona treatment or plasma treatment in order to enhance for example adhesion of the printing. Treated surfaces may also be top coated.

In a multilayer structure, thicknesses of separate layers may be different. Preferably, the core layer may be relatively thick compared to skin layer(s). In other words, the thickness of the core layer may be greater than the thickness of the first skin layer and/or the second skin layer. The thickness for the three layer facestock (1$^{st}$ skin %:core %:2$^{nd}$ skin %=total 100%), as shown in FIG. 4, may be 5:85:10, 5:90:5, or 10:80:10. The thickness of the second skin layer is from 2 to 30% of the total thickness of the face stock. For example, the thickness of the core layer may be between 60 and 90%, or between 70 and 90%, preferably between 75 and 90% or between 80 and 90% of the total thickness of the facestock layer. The thickness of the first skin layer may be at least 2% or at least 5%, between 2 and 10% or between 5 and 10% of the total thickness of the facestock. The thickness of the second skin layer may be at least 2% or at least 5%, between 2 and 30% or between 5 and 10% of the total thickness of the facestock layer.

According to an embodiment, a three layer facestock has asymmetric structure with respect to at least one of the following: thickness and composition of the first and the second skin layer. Three layer facestock having both different skin layer thicknesses and compositions may be referred to as a double asymmetric facestock.

An asymmetric multilayer facestock structure comprising different layer thicknesses and/or compositions may have effect on providing more optimized properties for the facestock, for example, high enough stiffness, good printability, good adhesive anchorage, and optimized die-cutting properties. A thin first skin layer may have effect on the haze of the multilayer facestock. A thick core layer together with a thin first skin layer may have effect on providing adequate mechanical properties for the facestock, e.g. adequate stiffness. Individual layers having thicknesses different from each other have effect on providing asymmetric face stock structure and more optimized functional properties of the facestock.

At least some/all embodiments have effect on providing more effective die-cutting of the labels. A multilayer facesock may have effect on optimized bursting of the face compressed by the tool's cutting edge during die-cutting. At least some/all embodiments have effect on providing undamaged silicone layer and the backing material (release liner) during cutting. For example, a face stock construction 5:85:10 has effect on providing optimized properties for label converting steps and subsequent labelling.

A symmetric structure whit respect to the thickness of the skin layers, such as 5:90:5 or 10:80:10, may have effect on providing easier manufacturing. A symmetric structure may further have effect on reducing the curling tendency of the film. Symmetric structure may provide e.g. good overall flatness of the face stock. Good overall flatness refers to absence of e.g. creases, wrinkles or wavy edges.

Preferably, a facestock has the total thickness smaller than 100 microns or smaller than 80 microns, preferably smaller than 75 microns or 60 microns. The face stock layer may have a total thickness between 30 and 80 microns, or between 40 and 60 microns, for example 50 microns.

According to an embodiment a facestock is oriented in one direction i.e. the face stock is uniaxially oriented. Uniaxial orientation, also referred to as monoaxial orientation (MO), refers to the stretching (drawing) provided only in one direction. A face stock may be uniaxially oriented in machine direction (MD), i.e. in the direction of the longitudinal movement of the continuous faces stock. Referring to FIGS. 1-6, the direction $S_x$ corresponds to the machine direction (MD) of the substrate. With reference to FIG. 5, the direction $S_y$ corresponds to the transverse direction (TD) of the substrate. TD is also referred to as a cross direction (CD) of the substrate.

According to an embodiment, a face stock is uniaxially stretched in the machine direction i.e. in the direction of the movement of the face stock (longitudinal direction of the continuous film) by a machine direction orientation process. Stretch ratio of the face stock may be at least 3 or at least 4, for example 7.5. Maximum for the stretch ratio is 9. Stretch ratio may be between 3 and 9, preferably between 5 and 7.5. A Stretch ratio together with the composition of the face stock provides properties suitable for label converting and subsequent application.

Monoaxial orientation of the face stock in machine direction may have effect on the modulus and stiffness of the face stock in the machine direction. For example, with increasing orientation degree in machine direction the modulus and stiffness of the face stock increases in said direction (MD). Further, orientation reduces the elongation of the face stock in said orientation direction. Monoaxial orientation may also have effect on maintaining low modulus, flexibility and conformability of the film in the transverse direction (cross-direction).

According to an embodiment, the machine direction oriented face stock is annealed (heat-set) after stretching. Annealing may enhance dimensional stability of the face stock. Annealed face stock is non-shrinkable at subsequent operation temperatures. The oriented face stock is dimensionally stable e.g. during following label laminate converting steps and during labelling. For example, the oriented face stock has a shrinkage less than 5%, preferably less than 2%, or more preferably less than 1% at temperatures below 30 degrees C. Pressure sensitive adhesive labels may comprise annealed face stock.

According to an embodiment, the machine direction oriented face stock may be non-annealed after stretching. In other words, the oriented substrate is cooled after stretching without an annealing step between the stretching and cooling. Non-annealed face stock may have effect on shrinking capability providing higher shrinkage e.g. over 10%.

Compositions of Facestock Layers

The facestock preferably has a plastic structure including layer(s) comprising or consisting of a polymer blend, also referred to as a polymer mixture, comprising polymeric ingredients. The facestock may also comprise non-polymeric additive(s). For example, a core layer may comprise one or more pigments or inorganic fillers as an additive to provide the facestock with a desired colour. Fillers may include, for example, titanium dioxide, calcium carbonate and blends thereof. Carbon black may be introduced to provide a black or grey facestock. An amount of pigment may be at most 20 wt. %. If the core layer includes pigment the total amount of polymer blend is reduced in proportion, for example at most 20 wt. %. Percentages of the ingredients in the layers are percentages by weight based on the total weight of the layer. According to an embodiment, a facestock has a three layer structure comprising a core layer, a first skin layer and a second sin layer, as shown in FIG. 4. The three layer structure with layer compositions disclosed below may have effect on providing good interlayer adhesion without tendency to delamination. It may also have effect on providing optimized label functionality, mechanical properties, and/or the visual appearance.

Core Layer

A core layer may comprise at least the following components: propylene homopolymer, low density polyethylene and at least one modifier. The modifier may be at least one of the following: hydrocarbon resin (HC resin), styrene block copolymer (SBC), and olefin block copolymer (OBC). Examples for the components are presented above in materials for facestock.

According to a first embodiment the core layer comprises a mixture of propylene homopolymer, low density polyethylene, and a mixture of modifiers comprising a first modifier and a second modifier. The first modifier may be hydrocarbon resin and the second modifier may be styrene block copolymer. In the core layer the content of polypropylene (PP) homopolymer is at least 50%, preferably at least 60%, more preferably at least 70% or at least 80%. Preferably the content of homo PP is not more than 95% or not more than 90%. The content of polypropylene may be between 50 and 90% or between 50 and 85%. As an example, the core layer may comprise 50%, 60%, 65%, 70%, 75%, 80% or 85% of propylene homopolymer.

Further, the core layer comprises low density polyethylene (LDPE). An amount of LDPE may be between 1 and 20%, preferably between 3 and 10%, or between 3 and 8%. The amount of LDPE may be 3%, 4% 5%, 6%, 7% or 8%. LDPE may have effect on stabilizing the facestock during manufacturing, thus improving the processability of the facestock. It may also have effect on improving the adhesion between the layers in multi-layered facestock structure. However, long branches of the LDPE make the orientation more complex and the content of LDPE is preferably less than 10%.

In addition, the core layer comprises a first modifier including HC resin. HC resin may have effect on improving the clarity of the facestock. The hydrocarbon resin may be added during the manufacturing process of a film as a HO resin compound (master batch) containing 60% of HO resin and a suitable carrier, such as thermoplastic olefin polymer.

The carrier may be for example, propylene homopolymer. In a core layer the content of hydrocarbon resin compound is at least 1% or 3%, preferably at least 6% or 9%. The content of HO resin compound is at most 18% or 15%. The HO resin compound content of the core layer may be between 5 and 20%, preferably between 8 and 18%. For example, the content of HO resin compound may be 5%, 8% 9%, 10%, 15 or 18%.

The core layer further includes a second modifier of styrene block copolymer(s). Styrene block copolymers include, for example, styrene-ethylene-propylene-styrene (SEPS), styrene-ethylene-butylene-styrene (SEBS), styrene-ethylenepropylene block copolymer (SEP) and styrene-ethylene-ethylene-propylene styrene block copolymer (SEEPS). Preferably styrene-ethylene-propylene-styrene (SEPS) is used. Optionally, styrene-ethylene-butylene-styrene (SEBS) may be used. It is also possible to use mixtures of styrene block copolymers, such as mixtures of SEBS and SEPS. The content of styrene block copolymer is at least 1% or 5%, preferably at least 9%. The core layer contains at most 20% or 17%, preferably at most 15% styrene block copolymer. The content may be between 5 and 20%, preferably between 8% and 15%, for example 5%, 8%, 12% or 15%.

In addition, the core layer may comprise minor components, such as between 0.5 and 3% of an antioxidant. The antioxidant may have effect on preventing gel formation due to the oxidation during extrusion process of the film. The antioxidant may also have effect on maintaining the mechanical properties of the film.

According to a second embodiment the core layer comprises a mixture of propylene homopolymer and at least one modifier. The core layer may comprise only one modifier, such as an olefin block copolymer. For example, ethylene-octene block copolymer as only modifier. Alternatively the core layer may comprise a mixture of modifiers comprising various olefin block copolymers, such as a first olefin block copolymer and a second olefin block copolymer. For example a mixture of modifiers comprising a first modifier of olefin block copolymer and a second modifier of olefin block copolymer. A mixture of modifiers may comprise olefin block copolymers including both A) ethylene-octene block copolymer(s) comprising alternating semicrystalline and amorphous segments and B) propylene-ethylene block copolymer(s) comprising isotactic polypropylene segments and crystalline polyethylene segments.

In the core layer the content of polypropylene (PP) homopolymer is at least 50%, preferably at least 60%, more preferably at least 70% or at least 80%. Preferably the content of homo PP is not more than 95% or not more than 90%. The content of polypropylene may be between 50 and 90% or between 50 and 85%. As an example, the core layer may comprise 70%, 75%, 80%, 85%, or 90% of propylene homopolymer.

Further, the core layer may comprise low density polyethylene (LDPE). An amount of LDPE may be between 1 and 20%, preferably between 3 and 10%, or between 3 and 8%. The amount of LDPE may be 3%, 4% 5%, 6%, 7% or 8%. LDPE may have effect on stabilizing the facestock during manufacturing, thus improving the processability of the facestock. It may also have effect on improving the adhesion between the layers in multi-layered facestock structure. However, long branches of the LDPE make the orientation more complex and the content of LDPE is preferably less than 10%.

In addition, the core layer comprises a first and a second modifier of olefin block copolymer. The first modifier may be ethylene-octene block copolymer comprising alternating semicrystalline and amorphous segments. An amount of ethylene-octene block copolymer may be between 5 and 20%, preferably between 8 and 15%. The amount of ethylene-octene block copolymer may be 8%, 10%, 12%, or 15%. The second modifier may be propylene-ethylene block copolymer comprising isotactic polypropylene segments and crystalline polyethylene segments. An amount of propylene-ethylene block copolymer may be between 1 and 10% or between 1 and 5%.The amount of propylene-ethylene block copolymer may be 1%, 2%, 3%, 4% or 5%.

The core layer may further comprise additives such as between 0.5 and 3% of an antioxidant compound. Total amount of antioxidant may be between 0.1 and 0.6%.

At least some/all embodiments of the core layer have effect on providing sufficient stiffness for the facestock. The core layer composition also affects the die-cutting performance of the label. Further, the core layer composition has effect on the conformability of the label.

First Skin Layer

In a multilayer face structure at least a first skin layer is preferably a printable skin layer i.e. the skin layer has sufficient surface energy, such as between 36 and 60 dynes/cm, providing efficient printing and adherence of the printing.

According to a first embodiment, a first skin layer, also referred to as a print receiving skin layer or printable skin layer, comprises at least the following components: propylene homopolymer and/or propylene copolymer; and linear low density polyethylene. In addition, the first skin layer may comprise minor amount of additives, such as antioxidant. Examples for the components are presented above in materials for facestock.

The first skin layer may comprise propylene homopolymer(s) between 30 and 50 wt. %, between 40 and 50 wt. %, or between 40 and 47 wt. %. Preferably the total amount of polypropylene homopolymer(s) is less than 50 wt. %, for example 49%, 48%, 46%, 45%, 44%, 40% or 35%, when calculated as a weight-% from all the components of the first skin layer. Alternatively and/or in addition the amount of the propylene homopolymer(s) is less than 50 wt. % of the total polymer content of the skin layer. Optionally the first skin layer may comprise a mixture of propylene homopolymer(s) and propylene copolymer(s). Above presented amounts are applicable as well with the mixture of propylene homopolymer(s) and propylene copolymer(s). It is also possible that the first skin layer comprises propylene polymers more than 50 wt. %, for example between 50 and 70 wt. %. Examples for the propylene polymers are provided above in materials for facestock.

In addition to polypropylene(s) the first skin layer further comprises linear low density polyethylene(s) (LLDPE). An amount of LLDPE may be between 50 and 60 wt. %, between 52 and 60 wt. %. Preferably the total amount of LLDPE is more than 50 wt. %, for example 51%, 52%, 53%, 54%, 55%, or 56%, when calculated as a weight-% from all the components of the skin layer. Alternatively and/or in addition the amount of the linear low density polyethylene(s) is more than 50 wt. % of the total polymer content of the skin layer. It is also possible that the first skin layer comprises linear low density polyethylene(s) less than 50 wt. %, for example between 30 and 50 wt. %.

The first skin layer may further comprise additives such as between 0.5 and 3% of an antioxidant compound. Total amount of antioxidant may be between 0.1 and 0.6%.

According to a second embodiment the first skin layer comprises propylene homopolymer(s) and/or propylene copolymer(s); and linear low density polyethylene. The first skin layer may further comprise a modifier. The first skin layer may comprise olefin block copolymer(s) (OBC). Olefin block copolymer may be ethylene-octene block copolymer. An amount of olefin block copolymer(s) may be between 0 and 15 wt. %. In case of addition of OBCs the amount of propylene polymers is decreased accordingly. In addition, the first skin layer may comprise minor amount of additives, such as antioxidant. The first skin layer comprising OBC may have effect on enhancing the ink-anchorage. Examples for the components of the skin layer composition are presented above in materials for facestock.

Second Skin Layer

In a multilayer facestock structure a second skin layer preferably has a composition close to the composition of the core layer. The second skin layer may also be referred to as an adhesive receiving skin layer.

A second skin layer comprises at least the following components: propylene homopolymer, and at least one modifier. The modifier may be at least one of the following hydrocarbon resin (HC resin), styrene block copolymer (SBC), and olefin block copolymer (OBC). The second skin may further include low density polyethylene (LDPE). LDPE may have effect on die-cutting properties of the facestock. Examples for the components of the second skin layer composition are presented above in materials for facestock.

According to a first embodiment the second skin layer comprises a mixture of propylene homopolymer and low density polyethylene, a mixture of modifiers comprising a first modifier and a second modifier. The first modifier may be hydrocarbon resin and the second modifier may be styrene block copolymer.

In the second skin layer the content of polypropylene (PP) homopolymer is at least 50%, preferably at least 60%, or at least 65%. Preferably the content of homo PP is not more than 95% or not more than 90%. The content of polypropylene may be between 50 and 90% or between 50 and 85%. As an example, the second skin layer may comprise 60%, 65%, 70%, 75%, 80% or 85% of propylene homopolymer.

Further, the second skin layer comprises low density polyethylene(s) (LDPE). An amount of LDPE may be between 1 and 20%, preferably between 3 and 10%, or between 3 and 8%. The amount of LDPE may be 3%, 4% 5%, 6%, 7% or 8%. The total amount of low density polyethylene of the second skin layer is less than 20 wt. %, when calculated as a weight-% from all the components of the second skin layer. Alternatively and/or in addition the amount of the low density polyethylene(s) is less than 20 wt. % of the total polymer content of the skin layer.

In addition, the second skin layer comprises a first modifier including HO resin. The hydrocarbon resin may be added during the manufacturing process of a film as a HO resin compound (master batch) containing 60% of HO resin and a suitable carrier, such as thermoplastic olefin polymer. The carrier may be for example, propylene homopolymer. In the second layer the content of hydrocarbon resin compound is at least 1% or 3%, preferably at least 6% or 9%. The content of HO resin compound is at most 18% or 15%. The HO resin compound content of the second skin layer may be between 5 and 20%, preferably between 8 and 18%. For example, the content of HO resin compound may be 8% 9%, 10%, 15 or 18%.

The second skin layer further includes a second modifier of styrene block copolymer(s). Styrene block copolymers include, for example, styrene-ethylene-propylene-styrene (SEPS), styrene-ethylene-butylene-styrene (SEBS), styrene-ethylenepropylene block copolymer (SEP) and styrene-ethylene-ethylene-propylene styrene block copolymer (SEEPS). Preferably styrene-ethylene-propylene-styrene (SEPS) is used. Optionally, styrene-ethylene-butylene-styrene (SEBS) may be used. It is also possible to use mixtures of styrene block copolymers, such as mixtures of SEBS and SEPS. The content of styrene block copolymer is at least 1% or 5%, preferably at least 9%. The core layer contains at most 20% or 17%, preferably at most 15% styrene block copolymer. The content may be between 5 and 20%, preferably between 8% and 15%, for example 5%, 8%, 12% or 15%.

In addition, the second skin layer may comprise minor amount of additives, such as between 0.5 and 3% of an antioxidant compound. Total amount of antioxidant may be between 0.1 and 0.6%.

Further, it may comprise an antiblocking agent compound, for example between 0.5 and 2%. An amount of antiblocking agent in the first skin layer may be between 0.05 and 0.2%.

According to a second embodiment the second skin layer comprises propylene homopolymer(s), and at least one modifier. The second skin layer may comprise only one modifier, such as an olefin block copolymer. For example, ethylene-octene block copolymer as only modifier. Alternatively the second skin layer may comprise a mixture of modifiers comprising various olefin block copolymers, such as a first olefin block copolymer and a second olefin block copolymer. The second skin layer may comprise a mixture of olefin block copolymers. For example a mixture of modifiers comprising a first modifier of olefin block copolymer and a second modifier of olefin block copolymer. In an example, the mixture comprises olefin block copolymers such as both A) ethylene-octene block copolymer(s) comprising alternating semicrystalline and amorphous segments and B) propylene-ethylene block copolymer(s) comprising isotactic polypropylene segments and crystalline polyethylene segments. The second skin layer may further comprise low density polyethylene. LDPE may have effect on die-cutting properties of the facestock.

In the second skin layer the content of polypropylene (PP) homopolymer is at least 50%, preferably at least 60%, more preferably at least 70% or at least 80%. Preferably the content of homo PP is not more than 95% or not more than 90%. The content of polypropylene may be between 50 and 90% or between 50 and 85%. As an example, the core layer may comprise 70%, 75%, 78%, 80%, 85%, or 90% of propylene homopolymer.

Further, the second skin layer comprises low density polyethylene (LDPE). An amount of LDPE may be between 1 and 20%, preferably between 3 and 10%, or between 3 and 8%. The amount of LDPE may be 3%, 4% 5%, 6%, 7% or 8%.

In addition, the second skin layer comprises a first and a second modifier of olefin block copolymer. The first modifier may be ethylene-octene block copolymer comprising alternating semicrystalline and amorphous segments. An amount of ethylene-octene block copolymer may be between 5 and 20%, preferably between 8 and 15%. The amount of ethylene-octene block copolymer may be 8%, 10%, 12%, or 15%. The second modifier may be propylene-ethylene block copolymer comprising isotactic polypropylene segments and crystalline polyethylene segments. An amount of propylene-ethylene block copolymer may be between 1 and 10% or between 1 and 5%.The amount of propylene-ethylene block copolymer may be 1%, 2%, 3%, 4% or 5%. The second skin layer comprising olefin block copolymers may have effect on providing enhanced adhesive anchorage.

In addition, the second skin layer may comprise minor amount of additives, such as between 0.5 and 3% of an antioxidant compound. Total amount of antioxidant may be between 0.1 and 0.6%.

Further, it may comprise an antiblocking agent compound, for example between 0.5 and 2%. An amount of antiblocking agent in the first skin layer may be between 0.05 and 0.2%.

Following are provided some examples of multilayer facestock structures.

Example 1

A facestock comprises three layer structure including the following layers: a $1^{st}$ skin layer and a core layer according to a $1^{st}$ embodiment disclosed in previous; a $2^{nd}$ skin layer according to $1^{st}$ embodiment disclosed in previous.

The first skin layer comprises propylene polymer(s) (PP), such as propylene homopolymer(s) and/or propylene copolymer(s); and linear low density polyethylene (LLDPE). In addition, the first skin layer comprises minor amount of antioxidant. An amount of propylene polymer(s) is less than 50 wt. %, for example between 40 and 49 wt. %. An amount of linear low density polyethylene is more than 50 wt. %, for example 51 and 56 wt. %. An amount of antioxidant compound is between 0.5 and 3 wt. %, for example 1%. Total amount of the above components of the first skin layer is 100%.

The core layer comprises at least the following components propylene homopolymer(s), low density polyethylene (LDPE), and a mixture of modifiers comprising a first modifier of hydrocarbon resin compound (HC resin) and a second modifier of styrene block copolymer(s) (SBC). Styrene block copolymer may be e.g. SEPS. An amount of propylene homopolymer(s) is at least 50 wt. %, or at least 60 wt. %, for example between 50 and 75 wt. %. Melt flow rate (MFR) of propylene homopolymers may be between 1.5 and 40 g/10 min, or between 1.5 and 25 g/10 min, when measured at 230° C./2.16 kg according to standard ISO 1133. An amount of low density polyethylene is between 1 and 8 wt. %. An amount of the first modifier of HC resin compound is between 5 and 20 wt. %. An amount of the second modifier of styrene block copolymer(s) is between 5 and 20 wt. %. Further the core layer comprises an antioxidant. An amount of the antioxidant compound is between 0.5 and 3 wt. %, for example 1%. Total amount of the above components of the core layer is 100%.

The second skin layer comprises the composition close to the core layer composition. The second skin layer comprises at least the following components propylene homopolymer(s), low density polyethylene (LDPE), and a mixture of modifiers comprising a first modifier of hydrocarbon resin compound (HC resin) and a second modifier of styrene block copolymer(s) (SBC). Styrene block copolymer may be e.g. SEPS. An amount of propylene homopolymer(s) is at least 50 wt. %, for example between 50 and 75 wt. %. Melt flow rate (MFR) of propylene homopolymers may be between 1.5 and 40 g/10 min, or between 1.5 and 25 g/10 min, when measured at 230° C./2.16 kg according to standard ISO 1133. An amount of low density polyethylene is between 1 and 8 wt. %. An amount of the first modifier of HC resin compound is between 5 and 20 wt. %. An amount of the second modifier of styrene block copolymer(s) is between 5 and 20 wt. % Further the second skin layer comprises an antioxidant. An amount of the antioxidant compound is between 0.5 and 3 wt. %, for example 1%. Further the second skin layer comprises an antiblocking agent. An amount of the antiblocking agent compound is between 0.5 and 2 wt. %. Total amount of the above components of the second skin layer is 100%.

The multilayer structure of example 1 may have effect on die-cutting properties of the facestock. Further, ink-anchorage of the facestock may be enhanced.

Example 2

A facestock comprises three layer structure including the following layers: a $1^{st}$ skin layer and a core layer according to a $2^{nd}$ embodiment disclosed in previous; a $2^{nd}$ skin layer according to $2^{nd}$ embodiment disclosed in previous.

The first skin layer comprises at least the following components: propylene polymer(s) (PP), such as propylene homopolymer(s) and/or propylene copolymer(s); and linear low density polyethylene (LLDPE). In addition, the first skin layer comprises minor amount of antioxidant. An amount of propylene polymer(s) is less than 50 wt. %, for example between 40 and 49 wt. %. An amount of linear low density polyethylene is more than 50 wt. %, for example 51 and 56 wt. %. An amount of antioxidant compound is between 0.5 and 3 wt. %, for example 1%.

Total amount of the above components of the first skin layer is 100%.

The core layer comprises propylene homopolymer(s) and at least one modifier. For example a modifier of olefin block copolymer, such as ethylene-octene block copolymer. Alternatively, the core layer may comprise a mixture of modifiers. The mixture of modifiers may comprise several olefin block copolymers, for example a first modifier of olefin block copolymer and a second modifier of olefin block copolymer. A mixture of modifiers may comprise olefin block copolymers including both A) ethylene-octene block copolymer(s) comprising alternating semicrystalline and amorphous segments and B) propylene-ethylene block copolymer(s) comprising isotactic polypropylene segments and crystalline polyethylene segments.

The content of the propylene homopolymer(s) is between 80 and 90%. Melt flow rate (MFR) of propylene homopolymers may be between 1.5 and 40 g/10 min, or between 1.5 and 25 g/10 min, when measured at 230° C./2.16 kg according to standard ISO 1133. An amount of the first modifier of ethylene-octene block copolymer(s) comprising alternating semicrystalline and amorphous segments may be between 5 and 20%. An amount of the second modifier of propylene-ethylene block copolymer comprising isotactic polypropylene segments and crystalline polyethylene segments may be between 0 and 10% or between 1 and 10%.

Further the core layer comprises an antioxidant. An amount of the antioxidant compound is between 0.5 and 3 wt. %, for example 1%.

Total amount of the above components of the core layer is 100%.

The second skin layer comprises the composition close to the core layer composition. The second skin layer comprises propylene homopolymer(s) and at least one modifier. For example a modifier of olefin block copolymer, such as ethylene-octene block copolymer. Alternatively, the second skin layer may comprise a mixture of modifiers. The mixture of modifiers may comprise several olefin block copolymers, for example, a mixture of modifiers comprising a first modifier of olefin block copolymer and a second modifier of olefin block copolymer. A mixture of modifiers may comprise olefin block copolymers including both A) ethylene-octene block copolymer(s) comprising alternating semicrystalline and amorphous segments and B) propylene-ethylene block copolymer(s) comprising isotactic polypropylene segments and crystalline polyethylene segments.

The content of the propylene homopolymer(s) is between 70 and 90%. Melt flow rate (MFR) of propylene homopolymers may be between 1.5 and 40 g/10 min, or between 1.5 and 25 g/10 min, when measured at 230° C./2.16 kg according to standard ISO 1133. An amount of the first modifier of ethylene-octene block copolymer(s) comprising alternating semicrystalline and amorphous segments may be between 5 and 20%. An amount of the second modifier of propylene-ethylene block copolymer comprising isotactic polypropylene segments and crystalline polyethylene segments may be between 0 and 10% or between 1 and 10%.

Further the second skin layer comprises an antiblocking agent. An amount of the antiblocking agent compound is between 0.5 and 2 wt. %.

Total amount of the above components of the second skin layer is 100%.

Example 3

A facestock comprises three layer structure including a $1^{st}$ skin layer as presented in an example 2. A core layer and a $2^{nd}$ skin layer differ from layers of example 2 so that they are further including low density polyethylene. An amount of LDPE is between 1 and 10%, preferably between 3 and 8%. The amount of polypropylene is decreased correspondingly. Total amount of the components of the core layer and the second skin layer layer is 100%.

Example 4

A facestock comprises three layer structure including a $1^{st}$ skin layer, a core layer and a $2^{nd}$ skin layer mainly as presented in the previous example 2. A difference is that in the multilayer facestock of an example 4, the core layer includes only the propylene homopolymer(s) having melt flow rate (MFR) between 2 and 9.5, between 2 and 7.5, or preferably between 2 and 4 g/10 min, when measured at 230° C./2.16 kg according to standard ISO 1133 and the skin layers include only the propylene polymer(s) having melt flow rate (MFR) between 2 and 7 g/10 min, or between 4 and 6 g/10 min, when measured at 230° C./2.16 kg according to standard ISO 1133.

A core layer and a $2^{nd}$ skin layer may further include low density polyethylene. An amount of LDPE is between 1 and 10%, preferably between 3 and 8%. The amount of polypropylene in the layer(s) is decreased correspondingly. Total amount of the components of the core layer and the second skin layer is 100%.

Example 5

A facestock comprises three layer structure including the following layers: a $1^{st}$ skin layer and a core layer according to a $2^{nd}$ embodiment disclosed in previous; a $2^{nd}$ skin layer according to $2^{nd}$ embodiment disclosed in previous. The first skin layer comprises at least the following components: propylene polymer(s) (PP), such as propylene homopolymer(s) and/or propylene copolymer(s); linear low density polyethylene (LLDPE); and olefin block copolymer (OBC). Olefin block copolymer is preferably ethylene-octene block copolymer. In addition, the first skin layer comprises minor amount of antioxidant. An amount of propylene polymer(s) is less than 50 wt. %, for example between 30 and 49 wt. %. An amount of OBC is between 0.5 and 15 wt. %. An amount of linear low density polyethylene is more than 50 wt. %, for example 51 and 56 wt. %. An amount of antioxidant compound is between 0.5 and 3 wt. %, for example 1%. Total amount of the above components of the first skin layer is 100%.

The core layer comprises propylene homopolymer(s) and at least one modifier. For example a modifier of olefin block copolymer, such as ethylene-octene block copolymer. Alternatively, the second skin layer may comprise a mixture of modifiers. The mixture of modifiers may comprise several olefin block copolymers, for example, a mixture of modifiers comprising a first modifier of olefin block copolymer and a second modifier of olefin block copolymer. A mixture of modifiers may comprise olefin block copolymers including both A) ethylene-octene block copolymer(s) comprising alternating semicrystalline and amorphous segments and B) propylene-ethylene block copolymer(s) comprising isotactic polypropylene segments and crystalline polyethylene segments.

The content of the propylene homopolymer(s) is between 80 and 90%. Melt flow rate (MFR) of propylene homopolymers may be between 1.5 and 40 g/10 min, or between 1.5 and 25 g/10 min, when measured at 230° C./2.16 kg according to standard ISO 1133. An amount of the first modifier of ethylene-octene block copolymer(s) comprising alternating semicrystalline and amorphous segments may be between 5 and 20%. An amount of the second modifier of propylene-ethylene block copolymer comprising isotactic polypropylene segments and crystalline polyethylene segments may be between 1 and 10%. Further the core layer comprises an antioxidant. An amount of the antioxidant compound is between 0.5 and 3 wt. %, for example 1%. Total amount of the above components of the core layer is 100%.

The second skin layer comprises the composition close to the core layer composition. The second skin layer comprises propylene homopolymer(s) and at least one modifier. For example a modifier of olefin block copolymer, such as ethylene-octene block copolymer. Alternatively, the second skin layer may comprise a mixture of modifiers. The mixture of modifiers may comprise olefin block copolymers, for example a mixture of modifiers comprising a first modifier of olefin block copolymer and a second modifier of olefin block copolymer. A mixture of modifiers may comprise olefin block copolymers including both A) ethylene-octene block copolymer(s) comprising alternating semicrystalline and amorphous segments and B) propylene-ethylene block copolymer(s) comprising isotactic polypropylene segments and crystalline polyethylene segments.

The content of the propylene homopolymer(s) is between 70 and 90%. Melt flow rate (MFR) of propylene homopolymers may be between 1.5 and 40 g/10 min, or between 1.5 and 25 g/10 min, when measured at 230° C./2.16 kg according to standard ISO 1133. An amount of the first modifier of ethylene-octene block copolymer(s) comprising alternating semicrystalline and amorphous segments may be between 5 and 20%. An amount of the second modifier of propylene-ethylene block copolymer comprising isotactic polypropylene segments and crystalline polyethylene segments may be between 1 and 10%.

Further the second skin layer comprises an antiblocking agent. An amount of the antiblocking agent compound is between 0.5 and 2 wt. %. The multilayer structure according to example 5 including OBC in all layers may have effect on enhancing conformability of the facestock. Further, ink-anchorage and die-cutting performance may be enhanced. Total amount of the above components of the second skin layer is 100%.

For the skilled person in the art, it will be clear that modifications and variations of the multilayer structures and compositions of the layers according to present invention are perceivable.

Manufacturing

A method for manufacturing an adhesive label laminate and labels thereof according to embodiments of the invention comprises forming a non-oriented multilayer face stock by melt processing technique, such as co-extrusion process. Stretching the continuous non-oriented face stock in a machine direction with a specific stretch ratio so as to provide a machine direction oriented multilayer face stock. Laminating the machine direction oriented face stock with a release liner for forming a label laminate. An adhesive layer is applied onto a surface of the face stock and/or onto a surface of the release liner prior to lamination step.

Stretching may be provided by means of a machine direction orienter via rolls with increasing speed. The stretching occurs due to a difference in speed between the last and the first rolls. In a stretching process the rolls are heated sufficiently to bring the substrate to a suitable temperature, which is normally below the melting temperature (Tm), or around the glass transition temperature (Tg) of the polymer.

According to an example, the method for manufacturing a machine direction oriented face stock further comprises cooling of the oriented face stock to an ambient temperature after the stretching for forming a non-annealed face stock. Cooling of the machine direction oriented face stock is performed right after the stretching i.e. cooling step directly follows the stretching in order to provide a non-annealed face stock.

According to an example, the method for manufacturing a machine direction oriented face comprises an annealing of the face stock after the stretching step for forming an annealed face stock. After annealing a cooling of the annealed face stock to an ambient temperature is provided.

Annealing may be performed in an annealing section, which allows stress relaxation of the oriented face stock by keeping the face stock at an elevated temperature for a certain period of time. After annealing cooling of the face stock to an ambient temperature is provided. The face stock may be called as annealed or alternatively as heat-set face stock.

The invention claimed is:

1. An adhesive label comprising an uniaxially in machine direction oriented multilayer facestock comprising layers in the following order: a printable skin layer, a core layer, and an adhesive receiving skin layer, wherein the printable skin layer comprises more than 56 wt. % of linear low density polyethylene(s), 40 to less than 44 wt. % of propylene polymer(s), and 0.5 to 3 wt % of an antioxidant compound; and wherein the adhesive receiving skin layer comprises at least 50 wt. % of propylene homopolymer(s) and the following modifier between 5 and 20 wt. % of ethylene-octene block copolymer, and wherein the adhesive receiving skin layer is coated with an adhesive layer for adhering the adhesive label to the surface of an item to be labelled.

2. An adhesive label according to claim 1, wherein the adhesive receiving skin layer further comprises the following modifier between 1 and 10 wt. % of propylene-ethylene block copolymer.

3. An adhesive label according to claim 1, wherein the core layer comprises at least 50 wt. % of polypropylene homopolymer(s), and the following modifier: between 5 and 20 wt. % of ethylene-octene block copolymer.

4. An adhesive label according to claim 3, wherein the core layer further comprises the following modifier: between 1 and 10 wt. % of propylene-ethylene block copolymer.

5. An adhesive label according to claim 3, wherein the adhesive receiving skin layer and the core layer further comprise less than 10 wt. % of low density polyethylene(s).

6. An adhesive label according to claim 1, wherein the printable skin layer further comprises between 0.5 and less than 3.5 wt. % of olefin block copolymer.

7. An adhesive label according to claim 6, wherein the olefin block copolymer is an ethylene-octene block copolymer.

8. An adhesive label according to claim 1, wherein the multilayer facestock is uniaxially oriented in machine direction having stretch ratio between 3 and 9.

9. An adhesive label according to claim 1, wherein the printable skin layer is 5% of the total facestock thickness, the core layer is 85% of the total facestock thickness, and the adhesive receiving skin layer is 10% of the total facestock thickness.

10. An adhesive label according to claim 1, wherein the adhesive layer comprises a pressure sensitive adhesive layer.

11. A facestock for an adhesive label, wherein the facestock is uniaxially oriented in machine direction and comprises layers in the following order a printable skin layer, a core layer, and an adhesive receiving skin layer, wherein the printable skin layer comprises more than 56 wt. % of linear low density polyethylene(s), 40 to less than 44 wt. % of propylene polymer(s), and 0.5 to 3 wt % of an antioxidant compound and wherein the adhesive receiving skin layer comprises at least 50 wt. % of propylene homopolymer(s) and the following modifier between 5 and 20 wt. % of ethylene-octene block copolymer.

12. A combination of an adhesive label and an article, wherein the adhesive label according to claim 1 is adhered through the adhesive layer to the surface of the article.

13. An adhesive label laminate comprising the adhesive label according to claim 1, wherein the adhesive label laminate layer is a pressure sensitive adhesive layer and a release liner is adjacent to the pressure sensitive adhesive layer.

* * * * *